United States Patent
Reif et al.

(10) Patent No.: US 12,044,053 B2
(45) Date of Patent: *Jul. 23, 2024

(54) DRIVE DEVICE FOR A HATCH

(71) Applicant: Stabilus GmbH, Koblenz (DE)

(72) Inventors: Thomas Reif, Kobern-Gondorf (DE); Jörg Hillen, Nörtershausen (DE)

(73) Assignee: Stabilus GmbH, Koblenz (DE)

( * ) Notice: Subject to any disclaimer, the term of this patent is extended or adjusted under 35 U.S.C. 154(b) by 514 days.

This patent is subject to a terminal disclaimer.

(21) Appl. No.: 17/409,292

(22) Filed: Aug. 23, 2021

(65) Prior Publication Data

US 2022/0056750 A1 Feb. 24, 2022

(30) Foreign Application Priority Data

Aug. 24, 2020 (DE) ..................... 10 2020 122 059.6

(51) Int. Cl.
*E05F 15/627* (2015.01)
*B62D 33/027* (2006.01)
(Continued)

(52) U.S. Cl.
CPC ........ *E05F 15/627* (2015.01); *B62D 33/0273* (2013.01); *B62D 33/03* (2013.01);
(Continued)

(58) Field of Classification Search
CPC ... B62D 33/0273; B62D 33/03; E05F 1/1238; E05F 15/627; B60P 1/26; B60P 1/267;
(Continued)

(56) References Cited

U.S. PATENT DOCUMENTS 5,449,212 A * 9/1995 Seifert .................. E05F 15/622
49/357
6,068,321 A * 5/2000 Ooms ................ B62D 33/0273
296/57.1
(Continued)

FOREIGN PATENT DOCUMENTS

CN 201763096 U 3/2011
CN 103832484 A 6/2014
(Continued)

OTHER PUBLICATIONS

German Application No. DE102020122059.6, Search Report, Aug. 3, 2021, 4 pages.
(Continued)

*Primary Examiner* — Gregory A Blankenship
(74) *Attorney, Agent, or Firm* — Kilpatrick Townsend & Stockton LLP

(57) ABSTRACT

The present invention relates to a drive device, comprising a cable which is connected at one end to a cable pulley, an actuator for driving the cable pulley, and a torsion bar which generates a torsional moment, wherein the torsion bar is supported on a higher-level assembly in such a way that it can move between a first and a second state of the torsion bar, wherein the torsion bar applies a torque in a first direction over a first partial movement range, applies a torque in a second direction opposite to the first direction over a second partial movement range, and does not apply torque over a third partial movement range. The present invention also relates to a superordinate hatch arrangement.

20 Claims, 7 Drawing Sheets

(51) Int. Cl.
*B62D 33/03* (2006.01)
*E05D 11/08* (2006.01)

(52) U.S. Cl.
CPC ......... *E05D 11/08* (2013.01); *E05Y 2201/266* (2013.01); *E05Y 2201/434* (2013.01); *E05Y 2201/654* (2013.01); *E05Y 2201/702* (2013.01); *E05Y 2201/704* (2013.01); *E05Y 2900/544* (2013.01)

(58) Field of Classification Search
CPC ......... E05Y 2201/266; E05Y 2201/654; E05Y 2201/434; E05Y 2201/702; E05Y 2201/704; E05Y 2900/544; E05D 11/08
See application file for complete search history.

(56) References Cited

U.S. PATENT DOCUMENTS

| | | | | |
|---|---|---|---|---|
| 6,145,917 | A * | 11/2000 | Ishii | E05F 1/1091 |
| | | | | 296/146.4 |
| 6,196,608 | B1 * | 3/2001 | Ooms | B62D 33/03 |
| | | | | 296/202 |
| 8,070,208 | B2 * | 12/2011 | Zielinsky | B62D 33/0273 |
| | | | | 296/57.1 |
| 8,087,710 | B2 * | 1/2012 | Zielinsky | B60P 1/26 |
| | | | | 296/57.1 |
| 8,109,553 | B2 * | 2/2012 | Zielinsky | E05F 1/1215 |
| | | | | 296/57.1 |
| 8,684,441 | B2 * | 4/2014 | Kerr, III | B60J 5/108 |
| | | | | 296/57.1 |
| 9,956,995 | B1 * | 5/2018 | Neighbors | B62D 33/0273 |
| 10,081,303 | B1 * | 9/2018 | Ngo | B60R 3/00 |
| 11,220,301 | B2 * | 1/2022 | Robinson | B62D 33/0273 |
| 11,345,418 | B2 * | 5/2022 | Lakerdas | B62D 33/037 |
| 2006/0242909 | A1 * | 11/2006 | Arquevaux | E05F 15/627 |
| | | | | 49/340 |
| 2009/0108613 | A1 * | 4/2009 | Krajenke | E05F 1/1292 |
| | | | | 296/57.1 |
| 2009/0189406 | A1 * | 7/2009 | Gleason | B62D 33/0273 |
| | | | | 49/386 |
| 2013/0038081 | A1 * | 2/2013 | Kerr, III | E05F 5/00 |
| | | | | 296/57.1 |
| 2016/0160553 | A1 * | 6/2016 | Nania | E05F 15/627 |
| | | | | 296/50 |
| 2017/0009508 | A1 * | 1/2017 | Hunt | B62D 33/0273 |
| 2018/0195332 | A1 * | 7/2018 | Martins | E05F 5/06 |
| 2018/0290693 | A1 * | 10/2018 | Ogden | B62D 33/037 |
| 2019/0301231 | A1 * | 10/2019 | Gabbianelli | E05F 15/00 |
| 2021/0155297 | A1 * | 5/2021 | Lakerdas | B62D 33/037 |
| 2021/0171127 | A1 * | 6/2021 | Harris | B62D 33/0273 |
| 2022/0056750 | A1 * | 2/2022 | Reif | E05D 11/08 |
| 2023/0339550 | A1 * | 10/2023 | Reif | B62D 33/03 |

FOREIGN PATENT DOCUMENTS

| | | | |
|---|---|---|---|
| CN | 207241824 U | 4/2018 | |
| CN | 109477354 A | 3/2019 | |
| CN | 209799670 U | 12/2019 | |
| DE | 112010003488 T5 | 10/2012 | |
| DE | 202015106598 U1 | 12/2015 | |
| DE | 202017107230 U1 | 12/2017 | |
| FR | 2885159 A1 * | 11/2006 | ............ E05D 11/00 |
| JP | 2001182425 A | 7/2001 | |

OTHER PUBLICATIONS

Chinese Application No. 202110968074.4, "Office Action", Oct. 26, 2022, 6 pages.
German Application No. DE102020122059.6, Search Report, Sep. 22, 2021, 4 pages.

\* cited by examiner

DRIVE DEVICE FOR A HATCH

CROSS REFERENCE TO RELATED APPLICATION

This application claims priority to German Patent Application No. 10 2020 122 059.6, filed in Germany on Aug. 24, 2020, the entire contents of which are hereby incorporated herein by this reference.

The present invention relates to a drive device for a hatch, in particular for a tailgate, comprising a cable, which is connected at one end to a cable pulley, which is configured to wind or unwind the cable according to the direction of rotation of the cable pulley, wherein the cable pulley is connected to a first superordinate assembly, such as a vehicle body, and which is connected at its other end to a second superordinate assembly, such as the hatch, which is pivotably attached relative to the first superordinate assembly, and comprising an actuator, which is configured to drive the cable pulley.

Drive devices for hatches, in particular for tailgates, which are attached, for example, as drop hatches to the rear of a pick-up truck, are known from the prior art. The hatches can be operated either by motor or by hand between a closed position and an open position. However, closing the hatch entirely by hand can be uncomfortable for an operator, due to the heavy weight of the tailgate.

It is therefore the object of the present invention to provide a drive device for a hatch which enables the hatch to be operated comfortably.

According to the invention, this object is achieved by a drive device for a hatch, in particular for a tailgate, comprising a cable which is connected at one end to a cable pulley, which is configured to wind or unwind the cable depending on the direction of rotation of the cable pulley, wherein the cable pulley is connected to a first superordinate assembly such as a vehicle body, and which is connected at its other end to a second superordinate assembly, such as the hatch, which is attached pivotably relative to the first superordinate assembly, an actuator which is configured to drive the cable pulley, and a torsion bar which is configured to generate a corresponding counter-torsional moment upon input of a torsional force into the torsion bar, wherein the torsion bar is further supported on at least one of the first and the second superordinate assemblies in such a manner that it can be moved between a first state of the torsion bar, which is associated in particular with a closed position of the hatch on the vehicle body, and a second state of the torsion bar, which is associated in particular to a maximally open position of the hatch on the vehicle body, wherein the torsion bar is arranged in such a way that it is configured to apply a torque in a first direction over a first partial movement range of a total possible movement range between the first and the second state of the torsion bar, wherein the first partial movement range extends from the first state of the torsion bar along the possible movement range in the direction of the second state of the torsion bar, wherein the torsion bar is further arranged in such a manner that it is configured to apply a torque in a second direction opposite to the first direction over a second partial movement range of the total possible movement range, wherein the second partial movement range extends from the second state of the torsion bar along the possible movement range in the direction of the first state of the torsion bar, and wherein the torsion bar is further arranged in such a way that it is configured not to apply any torque over a third partial movement range which is arranged between the first and the second partial movement ranges.

As a result, it is possible, on the one hand, to support and thus facilitate the closing of the hatch, for example from a horizontal orientation of the hatch, while on the other hand, the arrangement according to the invention can weaken a force with which the hatch reaches an end point of the movement range, for example if the hatch is released during opening. Weakening the force when the hatch drops down makes it possible in particular to reduce the load on bearing components of the hatch on the vehicle body or the like. Furthermore, the hatch opening process can be supported, for example, in the case in which a vehicle is parked in a downhill direction, in which case the hatch will be opened, at least initially, against the force of gravity.

Since the effect of the torsion bar depends on its torsional moment being exerted between the hatch and the assembly to which the hatch is attached, the torsion bar can either be attached to the hatch and supported on the higher-level assembly or attached to the higher-level assembly and supported on the hatch. The torsion bar can advantageously be arranged such that the torsion axis about which the torsion bar exerts the torsional moment is coaxial with a pivot axis of the hatch on the vehicle body.

In particular, the torsion bar can have at least one projection which is designed to engage in a recess formed in one of the first and second superordinate assemblies, wherein a movement path of the projection in the recess corresponds to the third partial movement range. As such, there is no support of the torsion bar over the third partial movement range, on either the hatch or the vehicle body, depending on which element the torsion bar is not attached to. When the end of the third partial movement range is reached, the projection can be supported on an edge of the recess, which defines a start of the first or the second partial movement range.

Furthermore, the total possible movement range of the torsion bar can extend over an angular range of at least 50° and at most 180°, in particular over an angular range of approximately 90°.

In a further development of the present invention, the cable pulley can be provided with a unidirectional clutch which is designed to mount the cable pulley with free rotation relative to the actuator in the direction of rotation of the cable pulley in which the cable is wound onto the cable pulley, and to mount the cable pulley in a torque-proof manner relative to the actuator in the other direction of rotation of the cable pulley. As is generally known for a unidirectional clutch, a clamping device can be arranged between a portion of the cable pulley which is connected to the cable and a portion of the cable pulley which is connected to the actuator, which clamping device allows a rotation of the two portions relative to each other in one direction of rotation, and forms the torque-proof mount of the cable pulley in the other direction of rotation. For example, blocking positions can be provided at regular intervals, in which a clamping device designed as a locking device can prevent a relative rotation of the cable pulley and the actuator. The clamping device can advantageously be designed as a ball- or roller clutch. A ball- or roller clutch can offer the advantage that, regardless of a momentary position of the clutch, upon a rotation in the blocking direction of the clutch, an almost immediate clamping effect of the clamping device can be achieved. A relative movement of the cable pulley with respect to the actuator in the blocking direction in order to actuate the clamping device should, however, not be regarded as a "rotatable mounting" in the context of the present invention.

A coil spring which is configured to exert a torque on the cable pulley in the winding direction of the cable pulley can be assigned to the unidirectional clutch, such that the cable pulley is rotated relative to the actuator when the cable tension is released. This can make it possible that, in the event that the hatch is closed by motor and is additionally moved manually in the direction of the closed position, a decrease in cable tension is compensated for by the coil spring. The cable pulley can be displaced in relation to the actuator using the unidirectional clutch. This can prevent the cable from being able to escape from a guide of the cable pulley. Of course, a different elastic preload element can also be used instead of a coil spring.

For example, the actuator can comprise an electric motor and a worm connected to the output side of the electric motor, which worm meshes with a worm gear which forms a portion of the cable pulley. The worm gear can be connected to the cable pulley or formed in one piece with it.

The drive device can furthermore comprise at least one deflection roll over which the cable runs between the cable pulley and the second superordinate assembly. The arrangement of a deflection roll makes it possible to deflect force vectors of forces which act within the cable, such that in particular the forces acting on the cable ends can act in a preferred direction on a corresponding fastening point. Furthermore, free positioning of associated components, in particular the cable pulley and/or the actuator, can be made possible in this way.

The cable pulley does not have to be completely round; it can also be designed in the form of a segment of a circle, in particular a segment of a quarter circle. As a result, the installation space required for the cable pulley can be reduced. For example, in the event that the cable pulley is designed as a quarter-circle segment and is configured for a movement of 90°, an entire—in this case, semicircular— installation space in which the cable pulley does not move can be saved.

In a further aspect, the present invention relates to a hatch arrangement, comprising:
 a hatch,
 a body to which the hatch is connected with articulation and which comprises a portion to be closed off by the hatch,
 a drive device according to the invention,
 wherein the first state of the torsion bar is associated with a closed state of the hatch on the body, and the second state of the torsion bar is associated with a maximally open state of the hatch on the body.

It should be noted that "maximally open" can mean "maximally open to the extent allowed". That is to say, a maximum opening of the hatch does not necessarily have to correspond to a maximum opening of the portion closed off by the hatch.

The torsion bar can be connected to the hatch in a torque-proof manner, and the torsion bar can have a projection which is designed to engage in a recess formed on the body, wherein a movement path of the projection in the recess between two end stops of the recess corresponds to the third partial movement range, a contact of the projection against one end stop of the recess corresponds to a beginning of the first partial movement range, which then extends up to the first state of the torsion bar, and a contact of the projection against the other end stop of the recess corresponds to a start of the second partial movement range, which then extends up to the second state of the torsion bar.

Furthermore, if a hatch arranged in its closed position relative to the body corresponds to an angle of 0°, the first partial movement range corresponds to an angular range of 0° to approximately 20°, the second partial movement range corresponds to an angular range of approximately 40° to a maximum of 180°, and the third partial movement range corresponds to an angular range of approximately 20° to approximately 40°. That is, in the angular range from 0° to about 20°, the torsion bar generates a torque in the opening direction of the hatch; in the angular range from about 20° to about 40°, the torsion bar generates no torque; and in the angular range from about 40° to a maximum of 180°, the torsion bar generates a torque in the closing direction of the hatch.

The position in an angular range of about 20° to about 40° is suitable for unhooking the tailgate, if the hinge construction allows, after detaching the cable, i.e., removing the cable from the hatch, which is then wound up via the coil spring, in order to allow uninstalling the tailgate, for example for special transport trips or loading. Below this torsion moment-free opening angle, the cable can be attached once again to the hatch—and the cable can be moved out of the wound position manually or by an electric motor for this purpose.

The hatch arrangement may further comprise a sling cable which is connected at one end to the body and at its other end to the hatch, and which is sized in such a manner that the sling cable is tensioned an angle of approximately 180° between the hatch and the body, in particular about 90°. The provision of a sling cable can provide an additional safeguard to ensure that the hatch is not moved beyond a maximum permitted open position.

As an alternative or in addition, the cable can comprise a stop element which is configured to come into contact with a counter stop at an angle between the hatch and the body of approximately 180°, in particular of approximately 90°, in relation to the closing angle of the hatch on the body of 0°, so as to prevent forces which are exerted on the portion of the cable which extends between the stop element and the hatch from being transmitted to the cable pulley. That is to say that, because the cable with the stop element rests against the counter stop, forces from the hatch can be introduced into the cable and then transmitted at the stop element out of the cable and into the counter stop. The counter stop can be formed, for example, by a cable pulley over which the cable runs, or by a portion on the body through which the cable is passed. As such, forces on the portion of the cable which extends from the stop element to the cable pulley can be reduced, and a load on the cable pulley can thereby be reduced. The stop element can, for example, be designed as a screw nipple connected to the cable.

The cable pulley can have a recess which is suitable for receiving the stop element when the cable with the associated portion is wound on the cable pulley. In particular, the recess can be designed to receive the screw nipple.

The present invention will be described in greater detail below using embodiments, with reference to the accompanying drawings. In the drawings.

Figure 1:
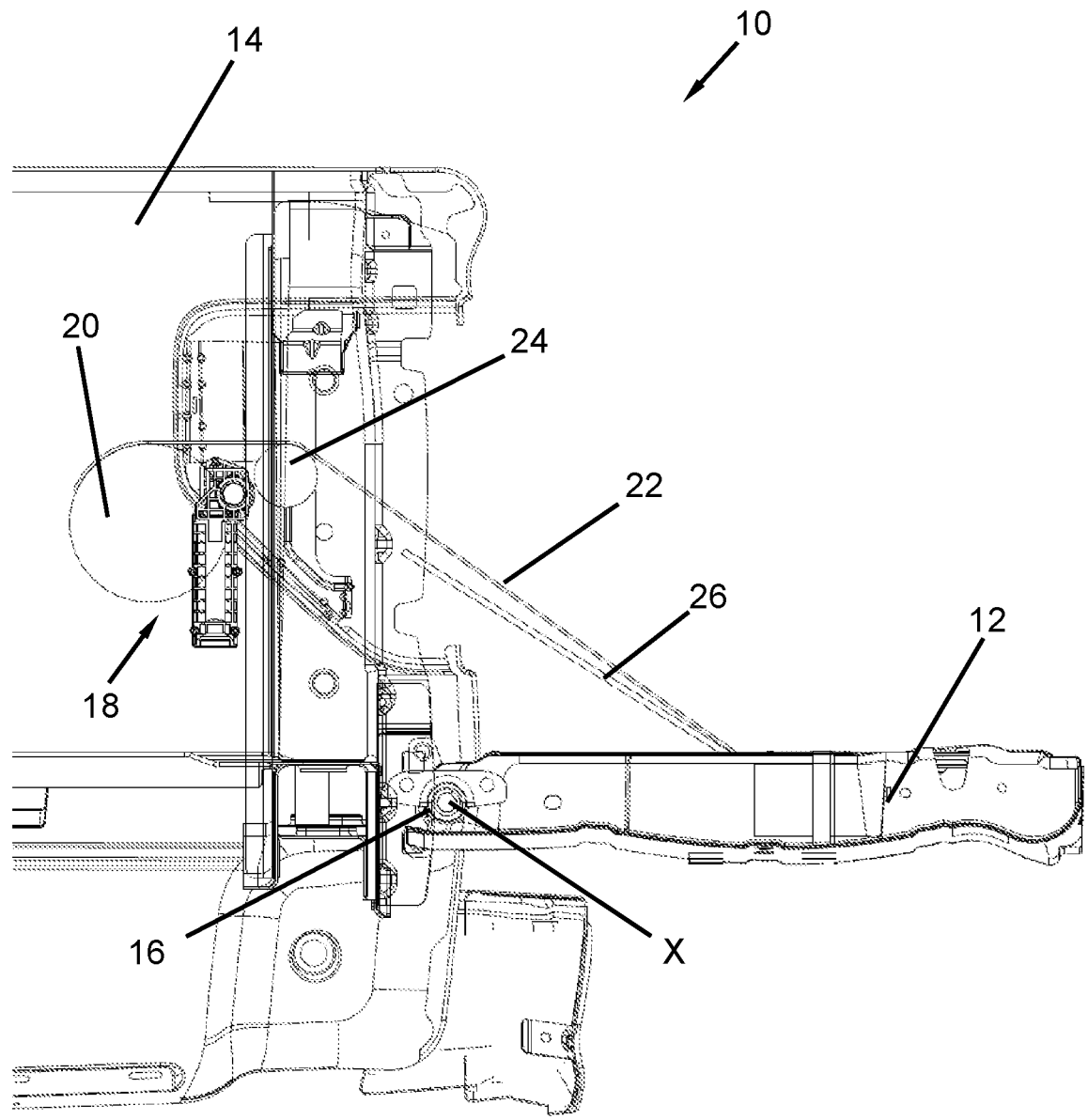
FIG. 1 is a lateral cross-sectional view of a hatch arrangement according to the invention, having a first embodiment of a drive device according to the invention.

In FIG. 1, a hatch arrangement according to the invention is indicated overall by the reference sign 10. The hatch arrangement 10 comprises a hatch 12 and a vehicle body 14, the hatch 12 being pivotable relative to the hatch 14 via a hinge 16 with an associated pivot axis X. The hatch 12 attached to the rear of the vehicle body 14 can be referred to as a so-called tailgate.

The hatch arrangement 10 further comprises a drive device 18 according to the invention, which in turn comprises a cable pulley 20 and a cable 22 which is connected at one end to the cable pulley 20 and at its other end to the hatch 12. The cable 22 runs between the cable pulley 20 and the hatch 12 over a deflection roll 24 in such a manner that the cable 22 initially extends from the cable pulley 20 to the deflection roll 24 substantially horizontally, and from the deflection roll 24 to the hatch 12 approximately at an angle of 45° relative to the horizontal.

Furthermore, a sling cable 26 is arranged between the hatch 12 and the vehicle body 14, which, in the orientation of the hatch arrangement 10 shown in FIG. 1, is under tension, such that the maximum allowed opening of the hatch 12 relative to the vehicle body 14 corresponds to a horizontal orientation of the hatch 12. In other words, since the closed state of the hatch 12 on the vehicle body 14 corresponds to a substantially vertical alignment of the hatch 12 in FIG. 1, a possible movement range of the hatch 12 relative to the vehicle body 14 about the pivot axis X is substantially 90°.

If the cable pulley 20 then rotates counter clockwise, as shown in FIG. 1, the cable 22 is wound onto the cable pulley 20 and the hatch 12 is displaced in the direction of its closed position. If the cable pulley 20 rotates clockwise in FIG. 1, the hatch 12 is lowered in the direction of the orientation shown in FIG. 1.

Figure 2:
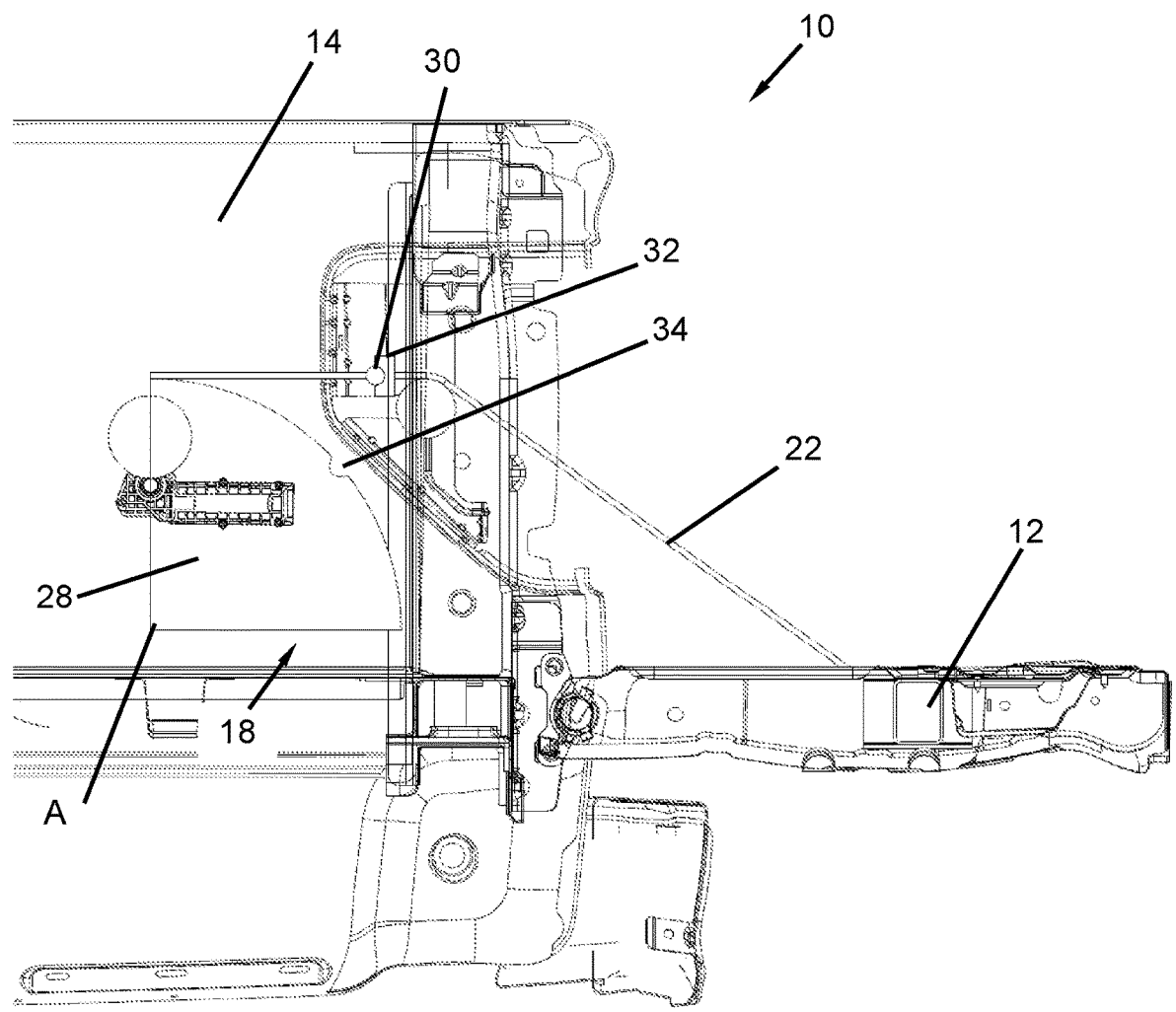
FIG. 2 is a lateral cross-sectional view of a hatch arrangement according to the invention, having a second embodiment of a drive device according to the invention.

In FIG. 2, the hatch arrangement 10 is shown in an orientation analogous to FIG. 1. Instead of the disc-shaped cable pulley 20 from FIG. 1, the drive device 18 according to FIG. 2 comprises a cable pulley 28 which is designed as a segment of a quarter circle. As can be seen in FIG. 2, the hatch 12 is oriented in its maximum permitted opening position relative to the vehicle body 14, and the quarter circle of the cable pulley 28 in FIG. 2 occupies the upper right quarter of an imaginary complete circle around an axis of rotation A in relation to the axis of rotation A of the cable pulley 28. A radius of the quarter circle segment can be designed in such a way that the cable pulley 28 occupies the upper left quarter of the imaginary complete circle around the axis of rotation A in the completely closed state of the hatch 12 on the vehicle body 14. Consequently, the installation space which is defined by the lower two quarters of the imaginary complete circle around the axis of rotation A is not required for the movement of the cable pulley 28.

In the embodiment according to FIG. 2, a stop element 30 is fixed to the cable 22. When the hatch 12 reaches its maximum permitted open position, the stop element 30 comes into contact with a counter stop 32, such that the portion of the cable 22 which extends between the stop element 30 and the hatch 12 also functions as a sling cable. In order to allow the cable 22 to be wound evenly onto the cable pulley 28, the cable pulley 28 has a recess 34 on its circumference, which is designed to receive the stop element 30.

Figure 3:
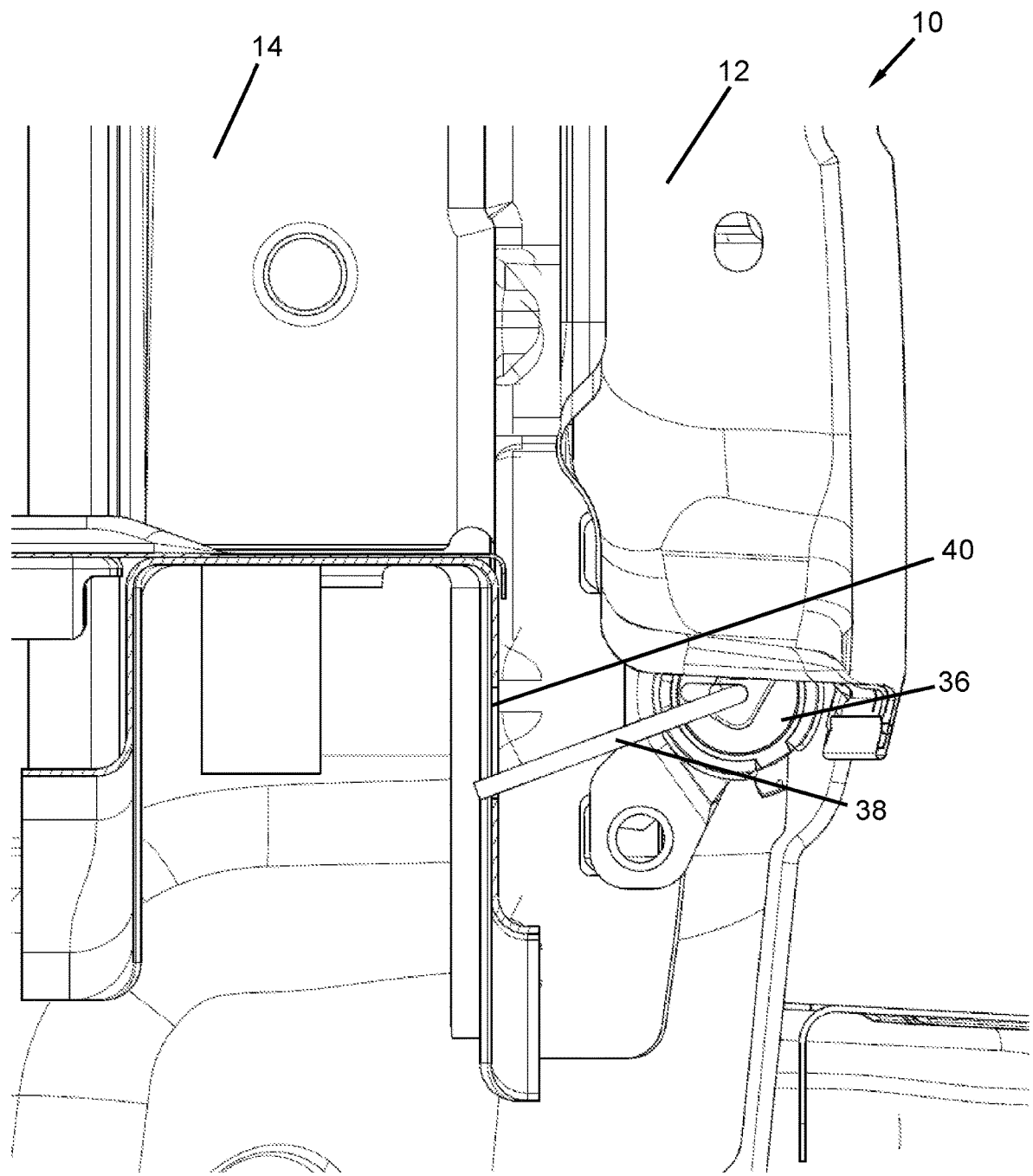
FIG. 3 is the hatch arrangement according to the invention, according to either FIG. 1 or 2, which is arranged in a first movement range.

In FIG. 3, the hatch 12 is shown in its completely closed position relative to the vehicle body 14. A torsion bar 36 is attached to the hatch 12. The torsion bar 36 has, in a generally known manner, two connecting portions, between which the torsion bar 36 generates a restoring torque when they are displaced relative to each other. The torsion bar 36 is connected with one of its connecting portions to the hatch 12, and a projection 38 is arranged on the other of its connecting portions. The projection 38 engages in a, for example, slot-like recess 40, and the projection 38 rests against the lower boundary thereof in FIG. 3, such that the torsion bar 36 generates a restoring torque which impels the hatch 12 relative to the vehicle body 14 in the direction of its open position. It is possible to prevent the torsion bar 36 from inadvertently displacing the hatch 12 in the direction of its open position, for example by using a locking mechanism which acts between the hatch 12 and the vehicle body 14. A movement range of the hatch 12 relative to the vehicle body 14 from the closed position shown in FIG. 3, which can be viewed as an angle of 0°, to the position of the hatch 12 relative to the vehicle body 14 in which the projection 36 just begins to lose contact with the lower boundary of the recess 40, can be regarded as a first partial movement range.

Figure 4:
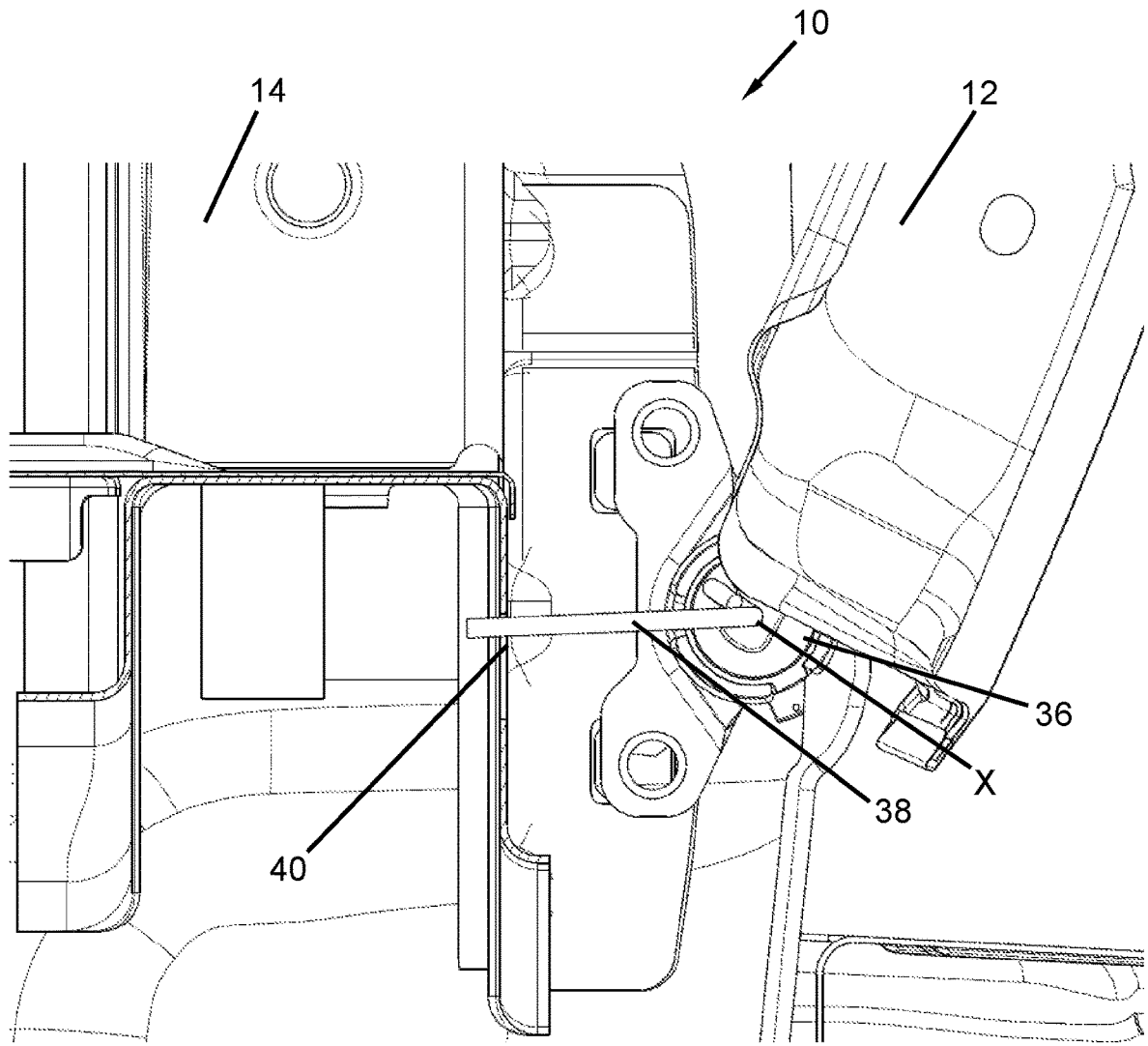
FIG. 4 is the hatch arrangement according to the invention, according to FIG. 1 or 2, which is arranged in a second movement range.

In FIG. 4, the hatch 12 is pivoted about the pivot axis X relative to the vehicle body 14 in such a way that the projection 38 rests neither against the lower boundary of the recess 40 nor against the upper boundary of the recess 40. In this state, the torsion bar 36 does not generate any restoring torque which acts on the hatch 12. The movement range of the hatch 12 relative to the vehicle body 14, extending from the position of the hatch 12 relative to the vehicle body 14 in which the projection 38 has just broken contact with the lower boundary of the recess 40 up to the position of the hatch 12 relative to the vehicle body 14 just before the projection 36 comes into contact with an upper boundary of the recess 40, can be regarded as a third partial movement range.

Figure 5:
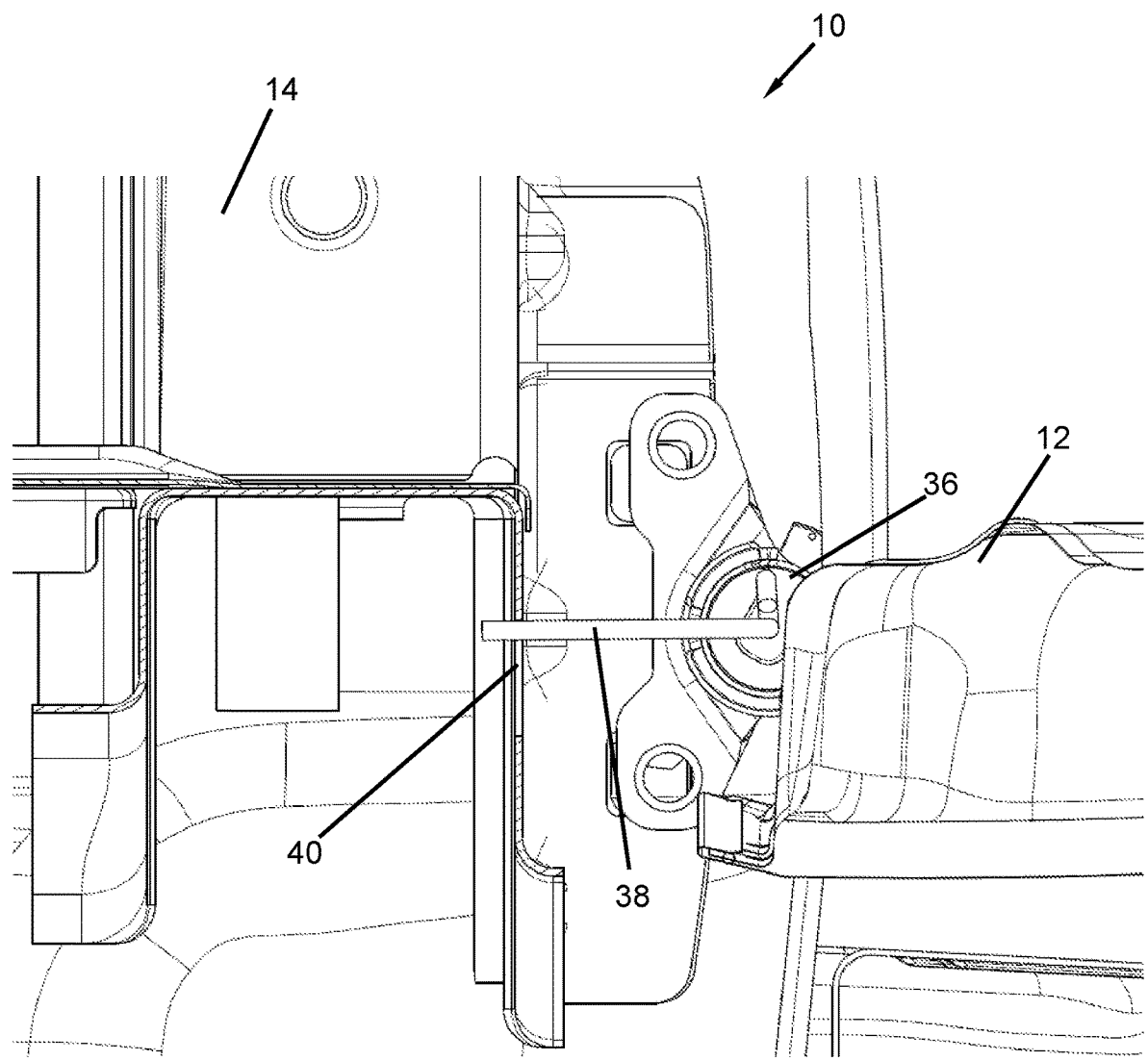
FIG. 5 is the hatch arrangement according to the invention, according to FIG. 1 or 2, which is arranged in a third movement range.

In FIG. 5, the hatch 12 is shown in its completely open position, as also shown in FIGS. 1 and 2. The projection 38 is contacting the upper boundary of the recess 40. As a result, the torsion bar 36 generates a restoring moment which impels the hatch 12 in the direction of its closed position relative to the vehicle body 14. The movement range between the position in which the projection 36 just comes into contact with the upper boundary of the recess 40 and the position of the hatch 12 in its fully open position can be regarded as a second partial movement range.

Figure 6:
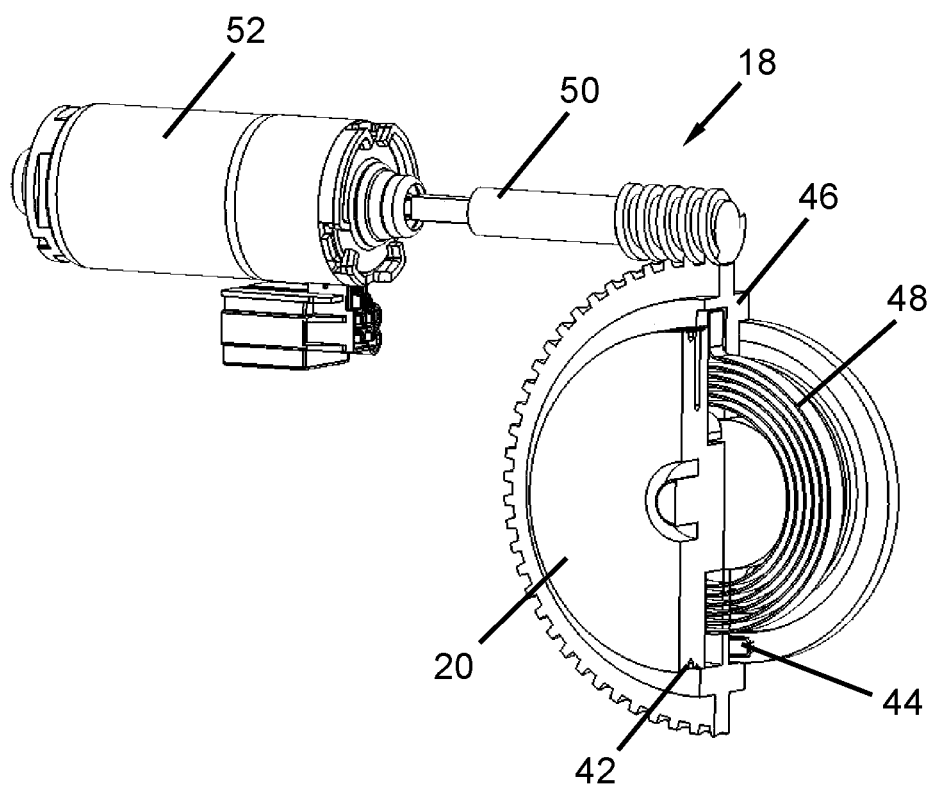
FIG. 6 is a perspective, partially sectional view of a portion of a drive device according to the invention.

In FIG. 6, the cable pulley 20 of the drive device 18 is shown in greater detail. The cable pulley 20 has a circumferential groove 42 on its outer circumference, in which the cable 22 can be received in a guided manner. In the embodiment shown in FIG. 6, the cable pulley 20 is connected to a worm gear 46 via a unidirectional clutch 44 in such a way that the clutch 44 allows a rotation of the cable pulley 20 relative to the worm gear 46 in a first direction of rotation, and prevents a rotation of the cable pulley 20 relative to the worm gear 46 in a second direction of rotation opposite to the first direction of rotation. Furthermore, a coil spring 48 is arranged between the cable pulley 20 and the worm gear 40, which preloads the cable pulley 20 relative to the worm gear 46 in the direction of the direction of rotation blocked by the clutch 44.

If, for example, when the cable 22 is being wound onto the cable pulley 20, the hatch 12 is manually moved in its closing direction in addition to a motorized operation of the hatch, the preloading of the coil spring 48 and the action of the clutch 44 can compensate for the reduced cable tension, or can take up free cable 22, in such a manner that the cable pulley 20 moves faster relative to the drive speed of the worm gear 46. As soon as the cable tension of the cable 22 reaches or exceeds a predetermined value again, the coil spring 48 can be pretensioned once again.

A worm 50 is connected to the worm gear 46 and can be driven by an electric motor 52 in such a way that a rotation of the worm 50 causes a rotation of the worm gear 46 and thus the cable pulley 20, corresponding to the direction of rotation of the worm 50.

The arrangement described above can of course also be applied to the quarter-circle-shaped cable pulley 28 or other embodiments which can be used as cable pulleys.

Figure 7:
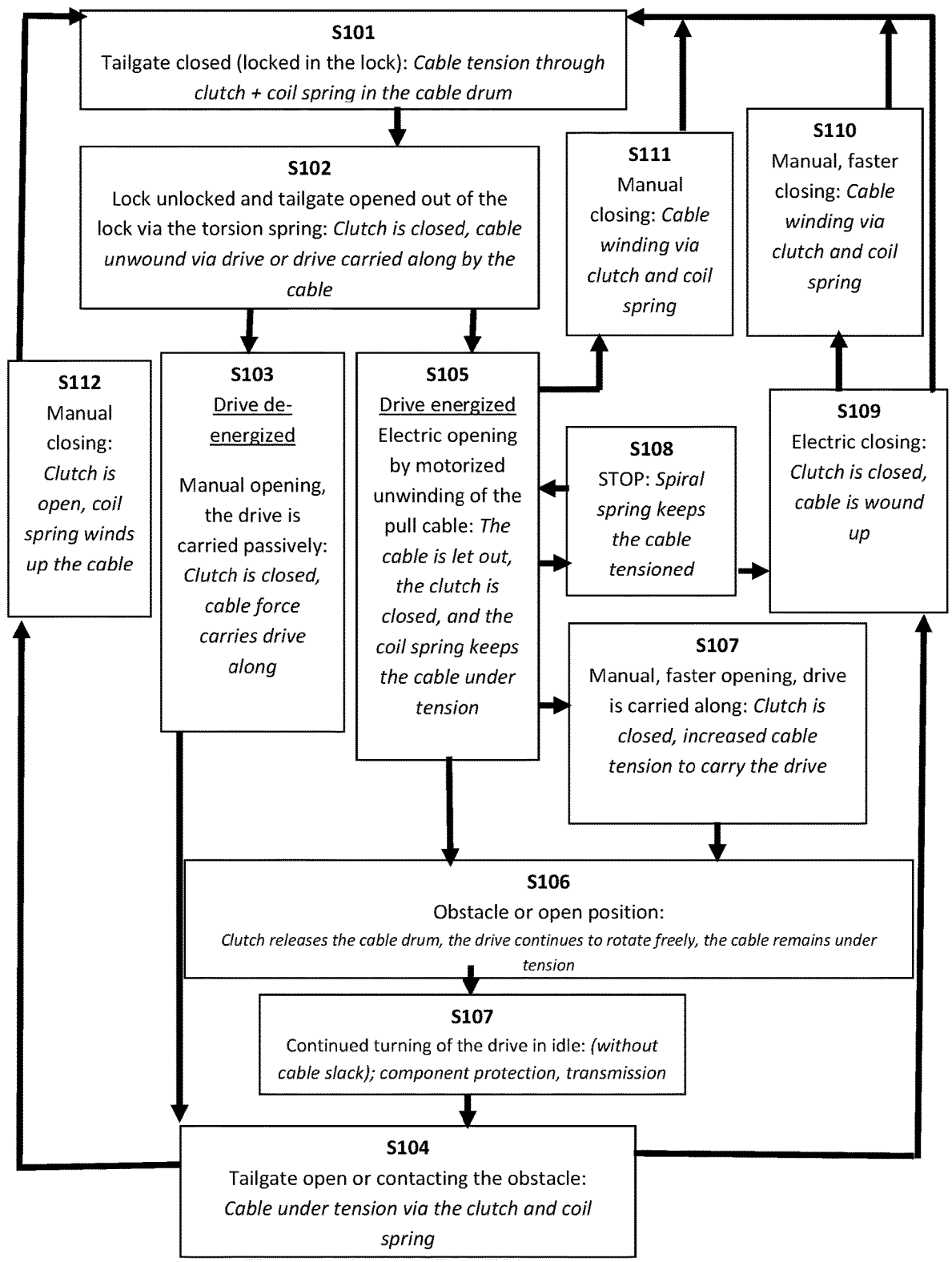
FIG. 7 is a flow chart of possible courses of action when the hatch arrangement is open or closed.

FIG. 7 shows a flow chart illustrating possible courses of action when the hatch arrangement is open or closed. Proceeding from the closed position of the tailgate, i.e. the hatch/tailgate of the hatch arrangement is locked in a lock on the vehicle body (step S101 in FIG. 7), the cable tension is generated in this closed position by the clutch and the coil spring in the cable drum. If the lock is unlocked and the tailgate is moved out of the closed position by the action of the torsion spring described above, the clutch is rotated in its blocking direction, i.e. the clutch is closed and the cable is unwound from the cable pulley via the actuator or, if the actuator does not rotate the cable pulley in relation to the movement of the tailgate sufficiently fast to unwind the cable, the drive/actuator is pulled along via the cable by the movement of the tailgate (step S102).

In a first case of step S103, the drive is operated without current—that is, the hatch is opened manually and the actuator is passively pulled along. The clutch remains closed and the actuator is operated by the cable force. If the tailgate has reached the end of its movement in the open position or has been stopped in an intermediate position, for example due to contact with an obstacle, the cable remains tensioned via the clutch and the coil spring (step S104).

In a second case (step S105), the actuator for driving the cable pulley is actively operated. In this case, the hatch is opened by the unwinding of the cable from the cable pulley due to the action of the actuator. This means that the cable is let out, the clutch is closed and the coil spring keeps the cable under tension. If the tailgate then reaches the open position or, as described above, comes to rest against an obstacle (step S106), the clutch releases the cable drum, such that the drive continues to rotate freely and the cable remains tensioned. In a subsequent step S107, the actuator can rotate in idle, such that components of the transmission can be protected without producing a significant decrease in the cable tension.

The action sequence then proceeds to the above-mentioned step S104, in which the cable is tensioned via the clutch and the coil spring.

As an alternative to step S106, when the actuator is actively operated to open the tailgate (step S105), the tailgate can also be manually moved in the direction of the open position, such that a speed of manual opening exceeds the speed of the motor drive speed of the actuator. In this case, the clutch is closed and the drive is pulled by manually moving the tailgate. This can lead to increased cable tension. The above-described step S106 then follows.

Furthermore, an active actuation of the actuator and thus a drive of the cable pulley can also be actively stopped (step S108) before the hatch has reached the open position or has come into contact with an obstacle. As during the unwinding of the cable, the coil spring will keep the cable under tension in this case as well. The active driving of the actuator (step S105) can then be continued, or the tailgate can be opened further manually (step S103) (not shown in FIG. 7). Alternatively, the actuator can be driven in a step S109 in such a way that the tailgate is moved in the direction of its closed position by the action of the actuator, that is to say by a motorized winding of the cable onto the cable pulley. The clutch is closed in this case, and the cable is wound onto the cable pulley. At the end of the movement path, the tailgate again reaches its closed position in accordance with step S101 described above.

When the tailgate closes under the action of the actuator, analogously to the motorized opening of the tailgate, the hatch can also be acted on by hand in such a way that a movement speed of the hatch in the direction of the closed position exceeds the speed at which the actuator winds the cable onto the cable pulley. In this case, a decrease in cable tension is compensated for via the clutch and the coil spring, such that the cable can be wound onto the cable pulley at a higher speed than the action of the actuator alone would allow (step S110). The action sequence then returns to step S101 when the tailgate has reached its closed position.

Of course, this manual closing can also take place without prior activation of the actuator in order to close the tailgate—for example, directly, while the actuator is still being operated in the opening direction of the tailgate. Analogously to step S110, in this case too the cable is wound onto the cable pulley via the clutch and the coil spring, such that the pull cable can be prevented from sagging.

In many cases, the tailgate will be moved into its open position (step S104), for example to load objects onto a loading area of a pick-up truck, and following step S104 the tailgate is then either closed electrically (step S109) or closed manually (step S112); in step S112, the clutch is opened and the coil spring winds the cable onto the cable pulley. The tailgate then reaches its closed position again (S101).

Of course, step S112 can also follow step S108 directly (not shown in FIG. 7).

It should be added at this point that a detection device can be connected to the actuator, which is configured, for example, to detect a position of the hatch, in particular a closed position, in order to deactivate or activate the actuator, for example.

Furthermore, the function of the combination of "cable, cable drum, clutch, motor drive" will be summarized again here in other words: The coil spring can preferably always have a spring preload—the lowest spring preload when the cable is wound up and the hatch is closed, the highest spring preload when the cable is unwound and the hatch is open. In order to be able to compensate for this resulting closing moment from the coil spring on the hatch, the torsion spring must initially exert an opening moment on the hatch, and then, at a greater opening angle of the hatch, the resulting opening moment which is exerted past the hatch's centre of gravity (minus the torsion spring moment which is now closing) is required to continue to unwind the coil spring.

The clutch can in particular be arranged inside the cable drum and connect a cable drum axle driven by an electric motor to the cable drum. If the cable drum axle is driven by an electric motor in the winding direction of the cable, this is the blocking direction of the clutch, and the outer cable drum is carried along—that is, it also rotates in the winding direction of the cable and winds the cable, i.e., the hatch closes.

If the hatch is open and the cable drum axle is not driven by an electric motor in the winding direction of the cable, but the hatch is closed manually, the cable tension is reduced, the clutch is open in this direction of rotation and the cable drum can be driven by the coil spring preload, can rotate freely in the winding direction of the cable, and can keep the cable under tension and/or wind it up.

Even if the cable is unhooked from the hatch, for example to uninstall the tailgate, the cable will tend to lay completely around the cable drum due to the coil spring pretension. The cable wants to disappear into the drive, so to speak, and must be pulled out of the drive by hand against the force of the coil spring to once again attach it to the hatch.

The clutch in this arrangement can in principle have four states at the same time, which are always dependent on the direction of rotation of the outer cable drum relative to the inner driven cable drum axle, and on the speed and size of the cable tension of the outer cable drum relative to the inner cable drum axle.

These states are:
1. The cable drum axle is driven in the winding direction of the cable, the cable drum axle rotates faster than the cable drum, the clutch is closed, the cable drum is carried along at the speed of the cable drum axle, the cable winds up, the hatch closes;
2. The cable drum axle is driven in the winding direction of the cable, the cable drum axle rotates more slowly (or is stationary) than the cable drum (for example, a quick manual hatch closing gives a high cable drum speed), the clutch opens, the cable drum rotates faster than the cable drum axle (due to the coil spring), the cable is wound up quickly, the cable tension is always preserved;
3. The cable drum axle is driven in the unwinding direction of the cable, the cable tension is sufficiently high due to the opening moment on the hatch, the clutch is closed, the cable drum is allowed to unwind the cable at the speed of the cable drum axle in the unwinding direction of the cable. No matter how high the opening moment of the hatch (=cable force), the cable drum cannot unwind faster than the speed of the cable drum axle, the clutch is closed, "motor-braked opening speed".
4. The cable drum axle is driven in the unwinding direction of the cable, the cable tension is too low due to the opening moment on the hatch (e.g. the hatch is prevented from opening); because the opening moment is absent and the cable tension is thus greatly reduced, the coil spring, which wants to wind, is dominant, the clutch opens, the cable drum will stop, and if necessary will wind in the winding direction of the cable up to the cable tension associated with the coil spring force, even while the cable drum axle is motor-driven in the unwinding direction of the cable.

The invention claimed is:

1. A drive device for a superordinate assembly comprising:
    a cable pulley;
    a cable connected at one end to the cable pulley, wherein the cable pulley is configured to wind or unwind the cable depending on a direction of rotation of the cable pulley,
    wherein the cable pulley is connected to a first superordinate assembly, and
    wherein the cable is connected at an other end to a second superordinate assembly, which is attached pivotably relative to the first superordinate assembly,
    an actuator configured to drive the cable pulley; and
    a torsion bar configured to generate a corresponding counter-torsional moment in response to an input of a torsional force into the torsion bar,
    wherein the torsion bar is supported on at least one of the first superordinate assembly and the second superordinate assembly so that the torsion bar is movable between a first state of the torsion bar and a second state of the torsion bar, wherein the first state of the torsion bar is associated with a closed position of the second superordinate assembly on the first superordinate assembly, and wherein the second state of the torsion bar is associated with a maximally open position of the second superordinate assembly on the first superordinate assembly,
    wherein the torsion bar is configured to apply a torque in a first direction over a first partial movement range of a total possible movement range between the first state of the torsion bar and the second state of the torsion bar, wherein the first partial movement range extends from the first state of the torsion bar along the possible movement range in the direction of the second state of the torsion bar,
    wherein the torsion bar is further configured to apply a torque in a second direction opposite to the first direction over a second partial movement range of the total possible movement range, wherein the second partial movement range extends from the second state of the torsion bar along the possible movement range in the direction of the first state of the torsion bar, and
    wherein the torsion bar is further configured not to apply any torque over a third partial movement range between the first and the second partial movement ranges.

2. The drive device of claim 1, wherein the torsion bar has at least one projection designed to engage in a recess formed in one of the first superordinate assembly and the second superordinate assembly, wherein a movement path of the projection in the recess corresponds to the third partial movement range.

3. The drive device of claim 1, wherein the total possible movement range of the torsion bar extends over an angular range of at least fifty degrees) (50° and at most one hundred eighty degrees (180°).

4. The drive device of claim 1, wherein the cable pulley further comprises a unidirectional clutch configured to mount the cable pulley with a free rotation relative to the actuator in a winding direction of rotation of the cable pulley wherein the cable is wound onto the cable pulley, and to mount the cable pulley in a torque-proof manner relative to the actuator in an other direction of rotation of the cable pulley opposite to the winding direction of rotation.

5. The drive device of claim 4, wherein the unidirectional clutch is assigned a coil spring, wherein the coil spring is configured to exert a torque on the cable pulley in the winding direction of rotation of the cable pulley, such that the cable pulley is rotated relative to the actuator when a tension of the cable decreases.

6. The drive device of claim 1, wherein the actuator comprises an electric motor and a worm connected to an output end of the electric motor, wherein the worm meshes with a worm gear, the worm gear forming a portion of the cable pulley.

7. The drive device of claim 1, wherein the drive device further comprises at least one deflection roll, wherein the cable runs over the at least one deflection roll between the cable pulley and the second superordinate assembly.

8. The drive device of claim 1, wherein the cable pulley is in a form of a segment of a circle.

9. The drive device of claim 1, wherein the first superordinate assembly comprises a vehicle body and the second superordinate assembly comprises a hatch.

10. The drive device of claim 3, wherein the angular range is approximately ninety degrees (90°).

11. The drive device of claim 8, wherein the segment of the circle is a quarter segment of the circle.

12. A hatch assembly, comprising:
a hatch,
a body to which the hatch is connected with articulation, the body comprising a portion to be closed off by the hatch,
a drive device, comprising:
 a cable pulley;
 a cable connected at one end to the cable pulley,
  wherein the cable pulley is configured to wind or unwind the cable depending on a direction of rotation of the cable pulley,
  wherein the cable pulley is connected to a first superordinate assembly comprising a vehicle body, and
  wherein the cable is connected at an other end to the hatch, which is attached pivotably relative to the first superordinate assembly,
 an actuator configured to drive the cable pulley; and
 a torsion bar configured to generate a corresponding counter-torsional moment in response to an input of a torsional force into the torsion bar,
  wherein the torsion bar is supported on at least one of the first superordinate assembly and the hatch so that the torsion bar is movable between a first state of the torsion bar and a second state of the torsion bar, wherein the first state of the torsion bar is associated with a closed position of the hatch on the vehicle body, and wherein the second state of the torsion bar is associated with a maximally open position of the hatch on the vehicle body,
  wherein the torsion bar is configured to apply a torque in a first direction over a first partial movement range of a total possible movement range between the first state of the torsion bar and the second state of the torsion bar, wherein the first partial movement range extends from the first state of the torsion bar along the possible movement range in the direction of the second state of the torsion bar,
  wherein the torsion bar is further configured to apply a torque in a second direction opposite to the first direction over a second partial movement range of the total possible movement range, wherein the second partial movement range extends from the second state of the torsion bar along the possible movement range in the direction of the first state of the torsion bar,
  wherein the torsion bar is further configured not to apply any torque over a third partial movement range between the first and the second partial movement ranges, and
  wherein the first state of the torsion bar is associated with a closed state of the hatch on the body, and the second state of the torsion bar is associated with a maximally open state of the hatch on the body.

13. The hatch assembly of claim 12,
wherein the torsion bar is connected to the hatch in a torque-proof manner,
wherein the torsion bar comprises a projection designed to engage in a recess formed on the body, and
wherein:
 a movement path of the projection in the recess between two end stops of the recess corresponds to the third partial movement range,
 a contact of the projection with the one of the two end stops of the recess corresponds to a beginning of the first partial movement range, which then extends up to the first state of the torsion bar, and
 a contact of the projection with the other of the two end stops of the recess corresponds to a beginning of the second partial movement range, which then extends up to the second state of the torsion bar.

14. The hatch assembly of claim 12, wherein, if the hatch arranged in its closed position relative to the body corresponds to an angle of zero degrees (0°):
the first partial movement range corresponds to an angular range of zero degrees (0°) to approximately twenty degrees (20°),
the second partial movement range corresponds to an angular range from approximately forty degrees (40°) to a maximum of one hundred eighty degrees (180°), and
the third partial movement range corresponds to an angular range from approximately twenty degrees (20°) to approximately forty degrees (40°).

15. The hatch assembly claim 12, further comprising a sling cable connected at one end to the body and connected, at its other end, to the hatch, wherein the sling cable is sized in such a way that the sling cable is tensioned when an angle between the hatch and the body is substantially one hundred eighty degrees (180°).

16. The hatch assembly claim 12, wherein the cable comprises a stop element configured to come into contact with a counter stop when an angle between the hatch and the body is substantially one hundred eighty degrees (180°), to prevent forces exerted on the portion of the cable extending between the stop element and the hatch from being transmitted to the cable pulley.

17. The hatch assembly of claim 16, wherein the cable pulley comprises a recess suitable for receiving the stop element when the cable, with the portion of the cable, is wound on the cable pulley.

18. The hatch assembly of claim 15, wherein the sling cable is sized in such a way that the sling cable is tensioned when the angle between the hatch and the body is substantially ninety degrees (90°).

19. The hatch assembly of claim 16, wherein the stop element is configured to come into contact with the counter stop when angle between the hatch and the body is substantially ninety degrees (90°).

20. The hatch assembly of claim 12, wherein the first superordinate assembly comprises a vehicle body.

* * * * *